United States Patent
Griot et al.

[15] 3,671,583
[45] June 20, 1972

[54] GLUTARIC ACID DERIVATIVES

[72] Inventors: Rudolf G. Griot, Florham Park; Mario G. Buzzolini, Morristown, both of N.J.

[73] Assignee: Sandoz-Wander, Inc., Hanover, N.J.

[22] Filed: March 25, 1968

[21] Appl. No.: 715,501

[52] U.S. Cl..................260/535 P, 260/501.16, 260/531, 260/633, 424/317
[51] Int. Cl.....................C07c 59/12, C07c 33/10
[58] Field of Search.........................260/535 P, 633

[56] References Cited

OTHER PUBLICATIONS

Neller: Chem. of Organic Compounds 2nd Ed. p. 173.

*Primary Examiner*—Lorraine A. Weinberger
*Assistant Examiner*—Paul J. Killos
*Attorney*—Gerald D. Sharkin, Frederick H. Weinfeldt and Robert S. Honor

[57] ABSTRACT

This invention relates to 3-hydroxy-3-trifluoromethyl glutaric acid. The compound is useful as a hypolipidemic.

2 Claims, No Drawings

GLUTARIC ACID DERIVATIVES

This invention relates to 3-hydroxy-3-trifluoromethyl glutaric acid, intermediates therefor, salts thereof and processes for their preparation.

The 3-hydroxy-3-trifluoromethyl glutaric acid of this invention may be represented by the formula

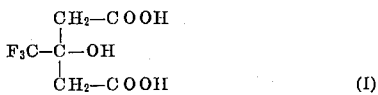

The process for preparing 3-hydroxy-3-trifluoromethyl glutaric acid (I) may be represented as follow:

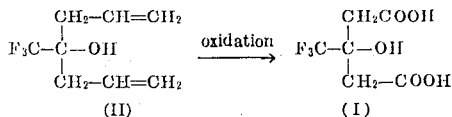

3-Hydroxy-3-trifluoromethyl glutaric acid (I) is prepared by the oxidation of 1,1-diallyl-2,2,2-trifluoroethanol (II). The preferred process for the preparation of 3-hydroxy-3-trifluoromethyl glutaric acid is by the treatment of 1,1-diallyl-2,2,2-trifluoroethanol with ozone at from −80° to 5° C. preferably −30° to 0° C., followed by refluxing with hydrogen peroxide. The process may be carried out under acidic conditions whereby the free acid is obtained. The ozonation is carried out in a solvent. Any solvent not attacked by ozone and liquid at the reaction temperature is satisfactory. Among the solvents which may be used are methylene chloride and chloroform.

The 1,1-diallyl-2,2,2-trifluoroethanol (II) may be prepared in accordance with the following reaction scheme:

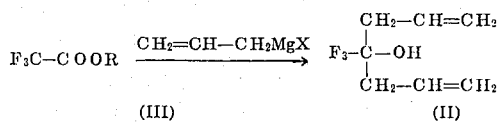

wherein

R is an alkyl group having one to six carbon atoms; and
X is chlorine, bromine or iodine.

Among the alkyl groups which may be mentioned are methyl, ethyl, propyl, butyl, cyclohexyl and the like.

The 1,1-diallyl-2,2,2-trifluoroethanol (II) is prepared by reacting in ether, ethyl trifluoroacetate with allyl magnesium bromide at a temperature of −20° to 20° C. preferably 0° to 20° C., followed by hydrolysis of the Grignard adduct.

Conventional recovery techniques are utilized for obtaining the products (I) and (II).

The corresponding salt capable of preparation from the 3-hydroxy-3-trifluoromethyl glutaric acid (I) are within the scope of this invention. The preferred salts are the alkali metal, the alkaline earth salts, and salts with pharmacologically inactive organic bases, e.g., ethanolamine etc.

The 3-hydroxy-3-trifluoromethyl glutaric acid (I) is useful because it possesses pharmacological properties in animals. In particular it possesses hypolipidemic activity as indicated in the rat fed, ad lib., a diet containing 0.01 to 0.03 percent of active compound for 10 days.

The compound (I) may be combined with a pharmaceutically acceptable carrier or adjuvant. It may be administered orally or parenterally. The dosage will vary depending upon the mode of administratine utilized. However, in general, satisfactory results are obtained when the compound is administered at a daily dosage of from 10 to 30 milligrams per kilogram of animal body weight. This daily dosage is preferably given in divided doses, e.g., 1 to 2 times a day, or in sustained release form. For most large animals the total daily dosage is from 10 mg. to 1 gram. Dosage forms suitable for internal administration comprise from about 5 milligrams to about 1 gram of the compound in admixture with a solid or liquid pharmaceutical carrier or diluent.

A representative formulation suitable for oral administration is a tablet prepared by standard tabletting techniques which contains the following: lactose

| Ingredient | Parts by Weight |
|---|---|
| 3-hydroxy-3-trifluoromethyl glutaric acid | 30 |
| tragacanth | 2 |
| lactose | 59.5 |
| corn starch | 5 |
| talcum | 3 |
| magnesium stearate | 0.5 |

This invention is illustrated but not limited by the following example.

EXAMPLE 3-hydroxy-3-trifluoromethyl glutaric acid

Step 1: 1,1-diallyl-2,2,2-trifluoroethanol 121 g (1 mole) of allyl bromide in 100 ml anhydrous ethyl ether was cautiously added with stirring to a suspension of 38 g (1.5 mole) of dry magnesium turnings in 375 ml anhydrous ether. The reaction flask was cooled in an ice bath and the addition was carried out at a rate which caused the ether to reflux gently. The mixture was kept at reflux temperature for an additional hour and the flask was then chilled in an ice bath. A solution of 71 g (0.5 mole) of ethyltrifluoroacetate in 100 ml anhydrous ether was added slowly to the Grignard reagent at room temperature over a period of 1 hour, the mixture was refluxed for an additional hour, chilled, hydrolyzed with ice water and acidified with dilute sulfuric acid. The aqueous layer was extracted with ether, the combined ethereal layers were washed neutral with water and dried over anhydrous magnesium sulfate. The solvent was removed by gentle warming (40° C.) under water pump pressure and the brown residual oil was fractionally distilled. The 1,1-diallyl-2,2,2-trifluoroethanol distilled at 49°–54° C. at water pump pressure.

Step 2: 3-hydroxy-3-trifluoromethyl glutaric acid

Ozone was bubbled through a solution of 18 g (0.1 mole) of the crude 1,1-diallyl-2,2,2-trifluoroethanol (of step 1) in 250 ml. ethyl acetate and 50 ml. glacial acetic acid. The reaction vessel was chilled in an ice bath. Ozone was generated by passing oxygen at a rate of 0.03 cubic feet per minute through a Welsbach ozonator at 115 volt. The ozone addition was stopped after 3.5 hours, glacial acetic acid (100 ml.) was added and the mixture concentrated to a syrup on a 50° C. water bath under reduced pressure. The colorless oil was dissolved in 100 ml. glacial acetic acid. A mixture of 120 ml. of 30 percent hydrogen peroxide, 100 ml. water and a few drops of concentrated sulfuric acid were added at room temperature and the solution refluxed for 5.5 hours. Sufficient barium carbonate was added to neutralize the sulfuric acid. The percipitate which formed was removed by filtration and the solution concentrated to dryness by heating at 60° C. under water pump pressure. The colorless oil crystallized during the drying process under high vacuum. The crystals were dissolved in ether, the solution was briefly shaken with charcoal and asbestos and filtered. The crude acid was dissolved in a minimal amount of acetone, chloroform was added and the product crystallized in needles at 0° C., m.p. 101°–102° C. A second recrystallization from the same solvent mixture gave a substantially pure 3-hydroxy-3-trifluoromethyl glutaric acid; m.p. 103.5°–104° C.

What is claimed is:

1. 3-Hydroxy-3-trifluoromethyl glutaric acid or pharmaceutical acceptable salts thereof.
2. 1,1-Diallyl-2,2,2-trifluoroethanol.

* * * * *